US008480274B2

(12) United States Patent
Wallace

(10) Patent No.: US 8,480,274 B2
(45) Date of Patent: Jul. 9, 2013

(54) SKATEBOARD LIGHTING APPARATUS

(76) Inventor: Terry Anthony Wallace, Greenville, NC (US)

( * ) Notice: Subject to any disclaimer, the term of this patent is extended or adjusted under 35 U.S.C. 154(b) by 248 days.

(21) Appl. No.: 13/027,936

(22) Filed: Feb. 15, 2011

(65) Prior Publication Data

US 2012/0044712 A1 Feb. 23, 2012

Related U.S. Application Data

(60) Provisional application No. 61/401,692, filed on Aug. 18, 2010.

(51) Int. Cl.
*F21S 8/10* (2006.01)
*B60Q 1/26* (2006.01)

(52) U.S. Cl.
USPC ............ 362/543; 362/234; 362/459; 362/806

(58) Field of Classification Search
USPC .................... 362/459, 543–545, 86, 234, 806
See application file for complete search history.

(56) References Cited

U.S. PATENT DOCUMENTS

| | | | | |
|---|---|---|---|---|
| 5,004,256 | A * | 4/1991 | Won | 280/87.042 |
| 5,119,277 | A * | 6/1992 | Copley et al. | 362/543 |
| 5,130,693 | A * | 7/1992 | Gigandet | 340/815.69 |
| 7,147,399 | B2 * | 12/2006 | Viscount et al. | 403/349 |
| 7,708,289 | B2 * | 5/2010 | Jaime, Sr. | 280/11.203 |
| D630,282 | S * | 1/2011 | Ebanks | D21/771 |
| 2009/0236811 | A1 * | 9/2009 | Lewis | 280/87.042 |

* cited by examiner

*Primary Examiner* — Alan Cariaso
(74) *Attorney, Agent, or Firm* — Dale J. Ream

(57) ABSTRACT

A lighting apparatus for use with a skateboard includes a light housing having top, bottom, and side walls defining an interior space. A fastener on the housing top wall is selectively attached to a lower surface of the skateboard. A plurality of lights is positioned in the light housing. A battery is also positioned in the light housing and electrically connected to the plurality of lights. The light housing wide walls are configured so that light from the plurality of lights is visible outside the light housing when the plurality of lights is energized. An extension structure may be connected to the light housing that extends away beyond one of the front and rear end of the skateboard. An entertainment device, such as a pinwheel is coupled to a free end of the extension structure.

17 Claims, 7 Drawing Sheets

SKATEBOARD LIGHTING APPARATUS

CROSS REFERENCE TO RELATED APPLICATION

This non-provisional patent application claims the benefit of provisional application Ser. No. 61/401,692 filed on Aug. 18, 2010, titled Detachable Skate Board Light Compartment.

BACKGROUND OF THE INVENTION

This invention relates generally to lighting devices and, more particularly, to a lighting apparatus for use with a skateboard that provides lighting features to the underside of the skateboard.

Learning to ride a skateboard has become an activity almost as common to children as learning to ride a bicycle. In fact, with the increasing popularity of "extreme sports," becoming skilled at performing tricks while riding a skateboard is, in some ways, more popular than merely riding a bicycle. Unfortunately, simply riding a skateboard on the driveway, sidewalk, or street—without more—quickly becomes mundane and lacking elements to keep a person's interest. In addition, a skateboard rider desires to impress other riders with the uniqueness or personal customization of his skateboard.

Although skateboards have been proposed with various shapes and sizes or with custom paint jobs and decals, they typically lack the visual advantages of lighting features. Further, the existing skateboards do not have entertainment devices suspended in front or behind the skateboard.

Therefore, it would be desirable to have a lighting apparatus for use with and for attachment to an otherwise conventional skateboard for entertainment and enjoyment purposes. Further, it would be desirable to have a lighting apparatus having entertainment devices suspended in front of or behind the skateboard. In addition, it would be desirable to have a lighting apparatus that is easily attachable and removable to a skateboard.

SUMMARY OF THE INVENTION

A lighting apparatus for use with a skateboard according to the present invention includes a light housing having top, bottom, and side walls defining an interior space. A fastener on the housing top wall is selectively attached to a lower surface of the skateboard. A plurality of lights is positioned in the light housing. A battery is also positioned in the light housing and electrically connected to the plurality of lights. The light housing wide walls are configured so that light from the plurality of lights is visible outside the light housing when the plurality of lights is energized. An extension structure may be connected to the light housing that extends beyond one of the front and rear end of the skateboard. An entertainment device, such as a pinwheel, is coupled to a free end of the extension structure.

Therefore, a general object of this invention is to provide a lighting apparatus for use with a skateboard that provides lighting features when attached to the underside of the skateboard.

Another object of this invention is to provide a lighting apparatus, as aforesaid, that projects light from one or more side walls of a lighting apparatus housing when energized.

Still another object of this invention is to provide a lighting apparatus, as aforesaid, having an extension device for supporting an entertainment device in front of or behind a skateboard.

Yet another object of this invention is to provide a lighting apparatus, as aforesaid, that includes sound projecting elements.

A further object of this invention is to provide a lighting apparatus, as aforesaid, that is easy to use and economical to manufacture.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
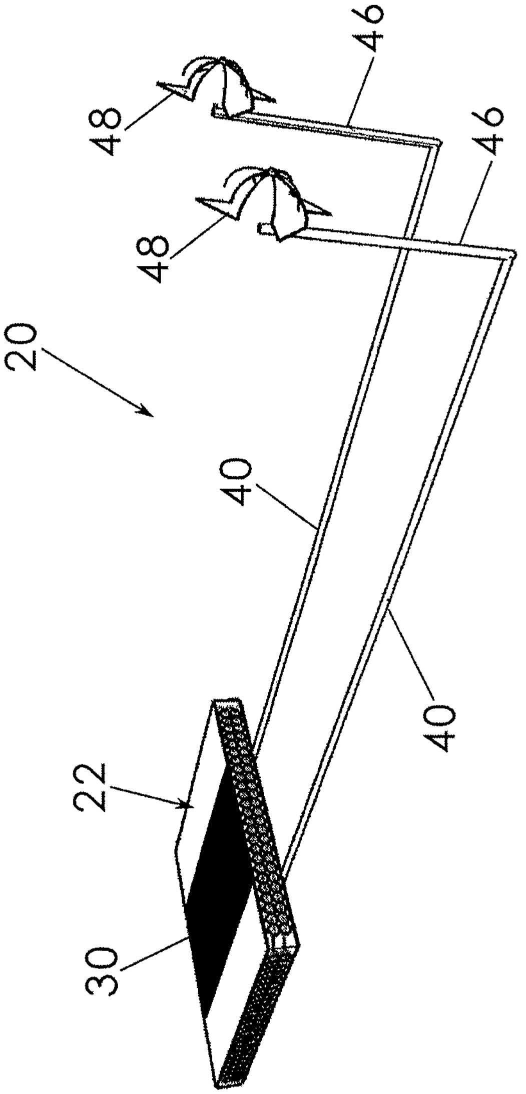
FIG. 1 is a front perspective view of a skateboard lighting apparatus according to a preferred embodiment of the present invention.
Figure 2:
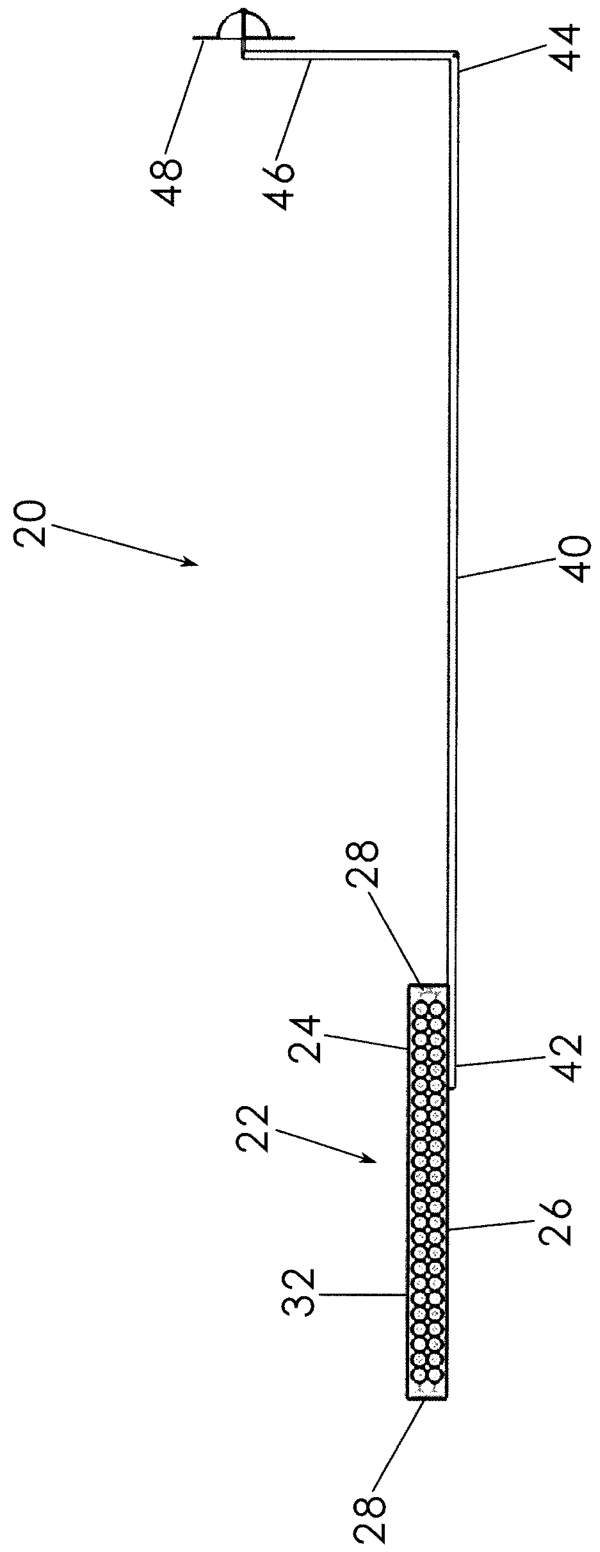
FIG. 2 is a side view of the lighting apparatus as in FIG. 1.

A lighting apparatus for use with a skateboard according to a preferred embodiment of the present invention will now be described with reference to FIGS. 1 to 7 of the accompanying drawings. The lighting apparatus 20 includes a light housing 22 and a plurality of lights 32. The lighting apparatus 20 may be attached to a skateboard 10 of a conventional type that includes an elongate riding member 12 having front 14 and rear 16 ends and upper 18 and lower 20 surfaces. The skateboard defines an imaginary longitudinal axis.

The light housing 22 includes opposed top 24 and bottom 26 walls with at least one side wall 28 extending between peripheral edges of respective top 24 and bottom 26 walls. The light housing 22 may include a circular configuration having a single circular or cylindrical configuration although a rectangular configuration having a plurality of side walls as shown in the accompanying figures would also work. The top 24, bottom 26, and side walls 28 of the housing 22 define an interior space for containing other components as will be described below.

An upper surface of the top wall 24 includes a fastener 30 for coupling the light housing 22 to the lower surface 20 of the skateboard 10. The fastener 30 may be an adhesive, complementary hook and loop fasteners, screws, bolt/nut combinations, or the like. Although the fastener 30 is configured to maintain the housing 22 securely to the skateboard 10, the fastener(s) may be released so that the light housing 22 may be selectively attached or removed, such as for storage or for attachment to another skateboard 10.

The plurality of lights 32 may be positioned in the interior space of the light housing 22. A battery 34 is also positioned in the housing interior space and electrically connected to the plurality of lights 32 so as to selectively energize the lights. The battery 34 may be accessed through a battery door 35 removably or pivotally coupled to the bottom wall 26 of the lighting housing 22. An on/off switch 36 may be positioned on the housing 22 and connected to the battery 34 and plurality of lights 32 for selectively allowing current to flow between the battery 34 and plurality of lights 32.

Figures 3A, 3B:
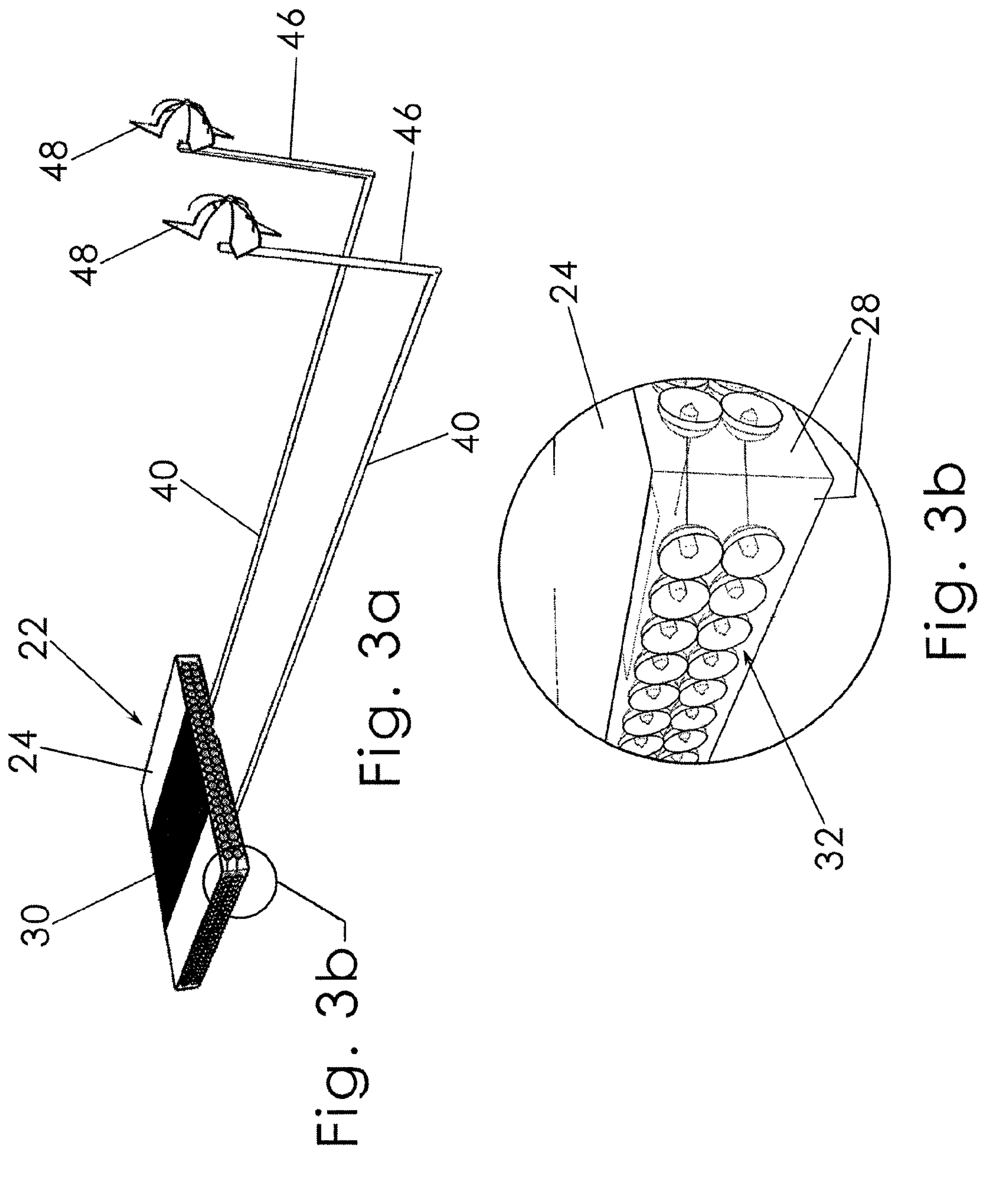
FIG. 3*a* is another front perspective view of the lighting apparatus as in FIG. 1.
FIG. 3*b* is an isolated view on an enlarged scale taken from FIG. 3*a;*
Figure 4:
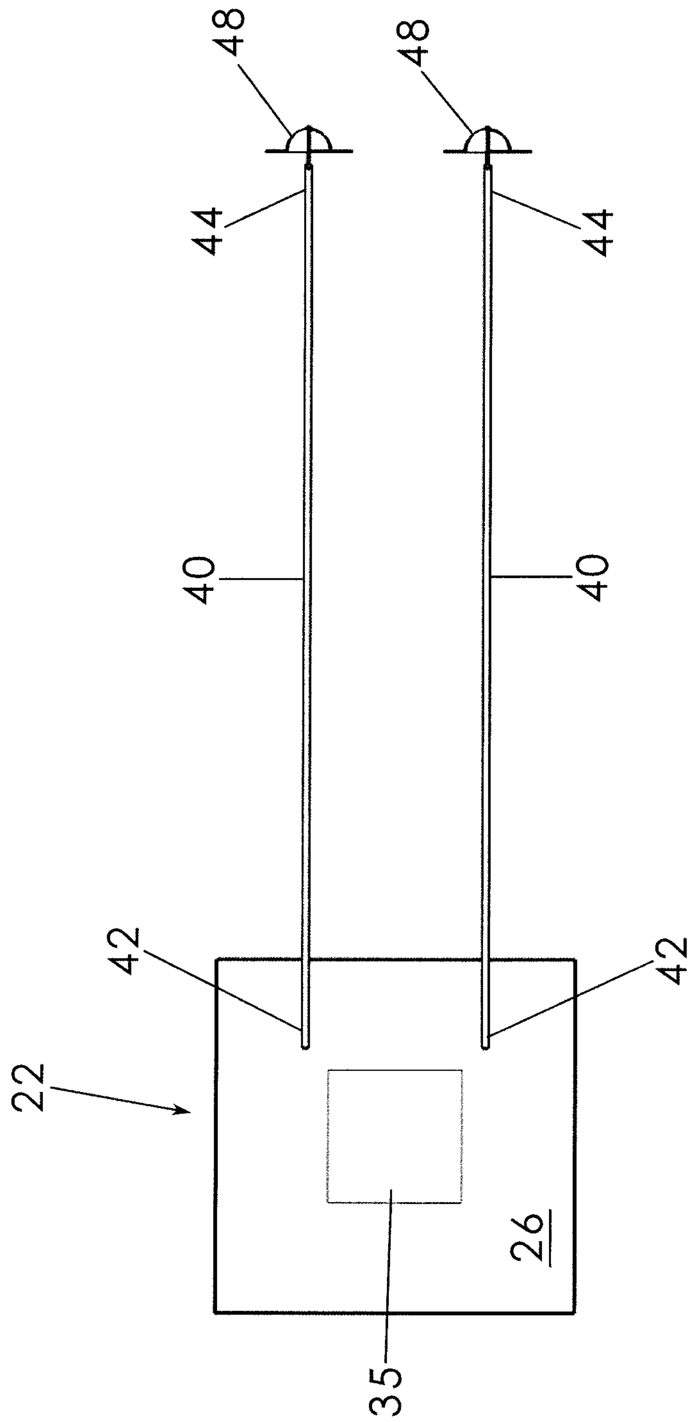
FIG. 4 is a bottom view of the lighting apparatus as in FIG. 1.
Figure 5:
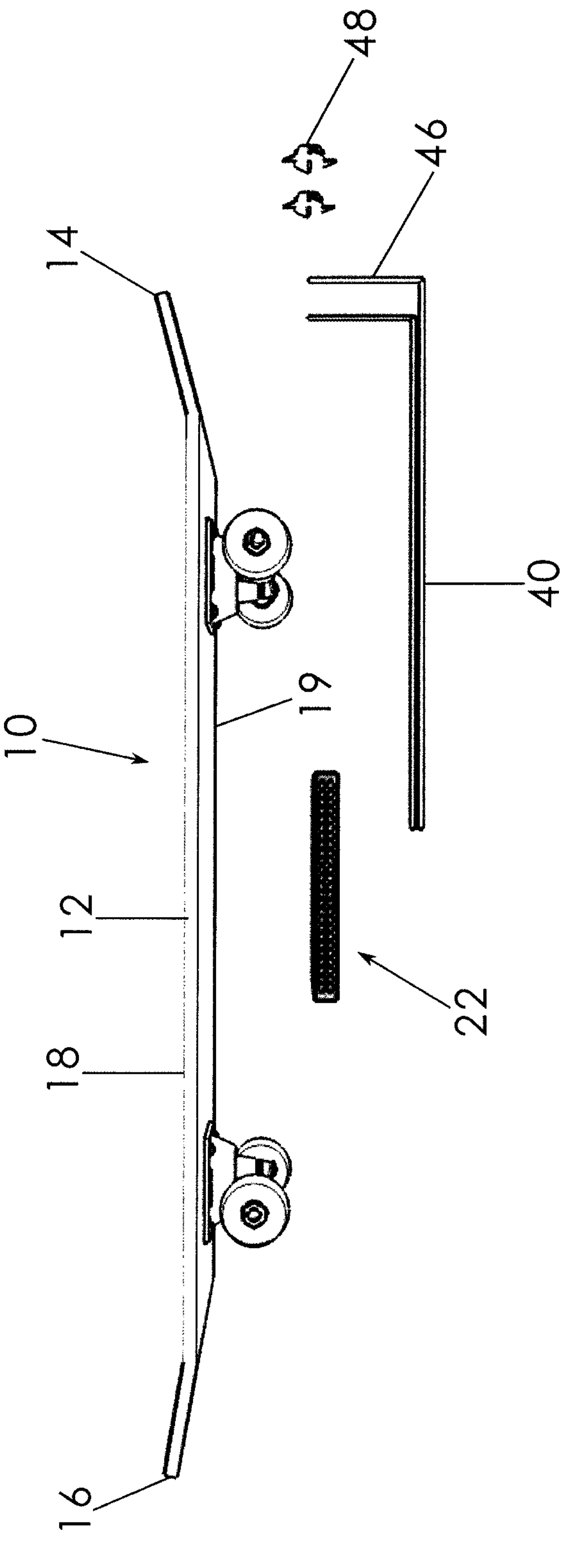
FIG. 5 is an exploded view of the lighting apparatus in use with a skateboard.

Each of the side walls 28 of the light housing 22 may be constructed of an entirely or substantially transparent material (i.e. translucent), such as an appropriate plastic material so that light from the plurality of lights 32 may pass therethrough when energized by the battery 34. Alternatively, each side wall 28 may define a plurality of spaced apart apertures (not shown) through which light from the energized plurality of lights. Specifically, the apertures may be configured to actually receive the light emitting portions of respective lights (FIG. 3*b*). In other words, each light may be inserted through a respective aperture from the inside of the light housing 22. Preferably, each light is a light emitting diode so that battery power is minimized and durability is maximized.

The lighting apparatus 20 may also include at least one extension member 40 having a proximal end 42 coupled to the light housing 22 and extending away therefrom. More particularly, the proximal end 42 may be attached to a lower surface 20 of the bottom wall 26 and extend outwardly parallel to the imaginary longitudinal axis of the skateboard 10. Preferably, the extension member 40 (also referred to as a first extension member) has an elongate configuration that includes a distal end 44 extending beyond either the front 14 or rear 16 end of the skateboard (FIGS. 5 and 6) depending on the orientation of the lighting housing 22. An auxiliary extension member 46 (also called a second extension member) may be attached to the distal end 44 of the extension member 40 and extends upwardly therefrom. The auxiliary extension member 46 is perpendicular to the extension member 40. An entertainment device 48 is fixedly attached to either the distal end 44 of the extension member 40 (not shown) or from a free end of the auxiliary extension member 46 as shown in the figures. The entertainment device 48 may be a pinwheel that is rotatably coupled to the extension member such that it spins as air passes through it when the skateboard 10 is in motion.

Figure 6:
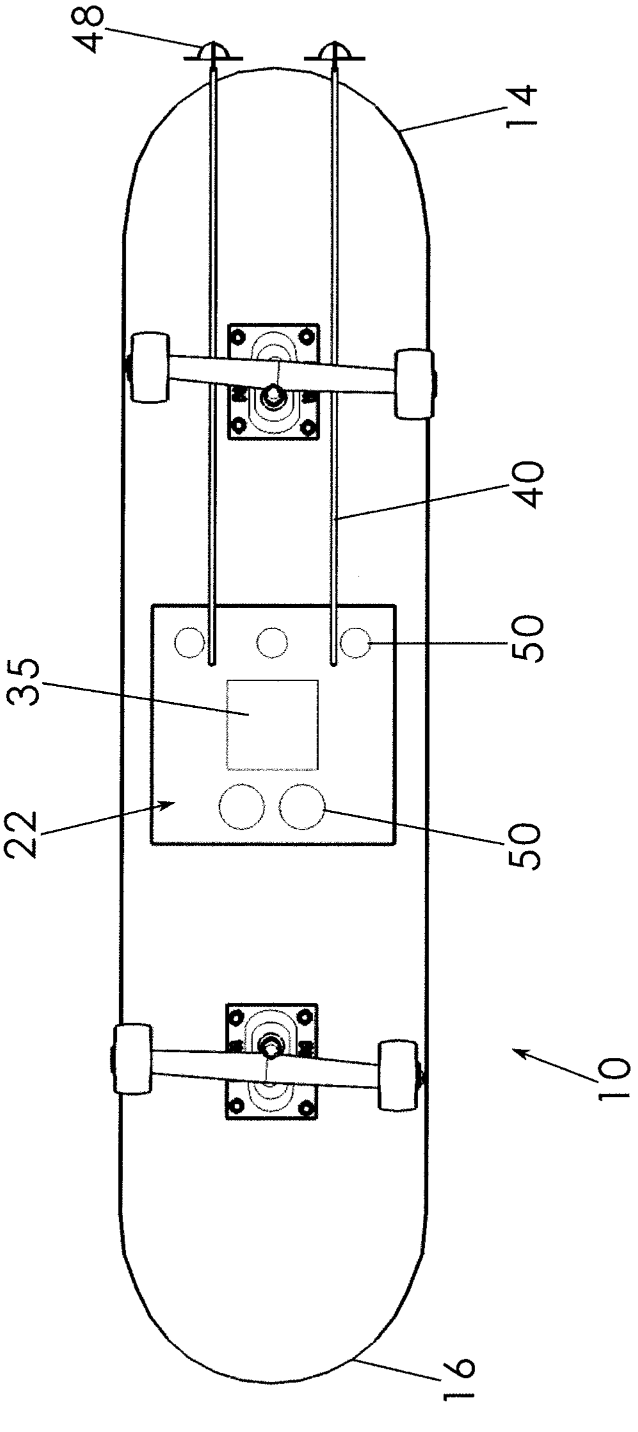
FIG. 6 is a bottom view of the lighting apparatus according to another embodiment of the present invention.
Figure 7:
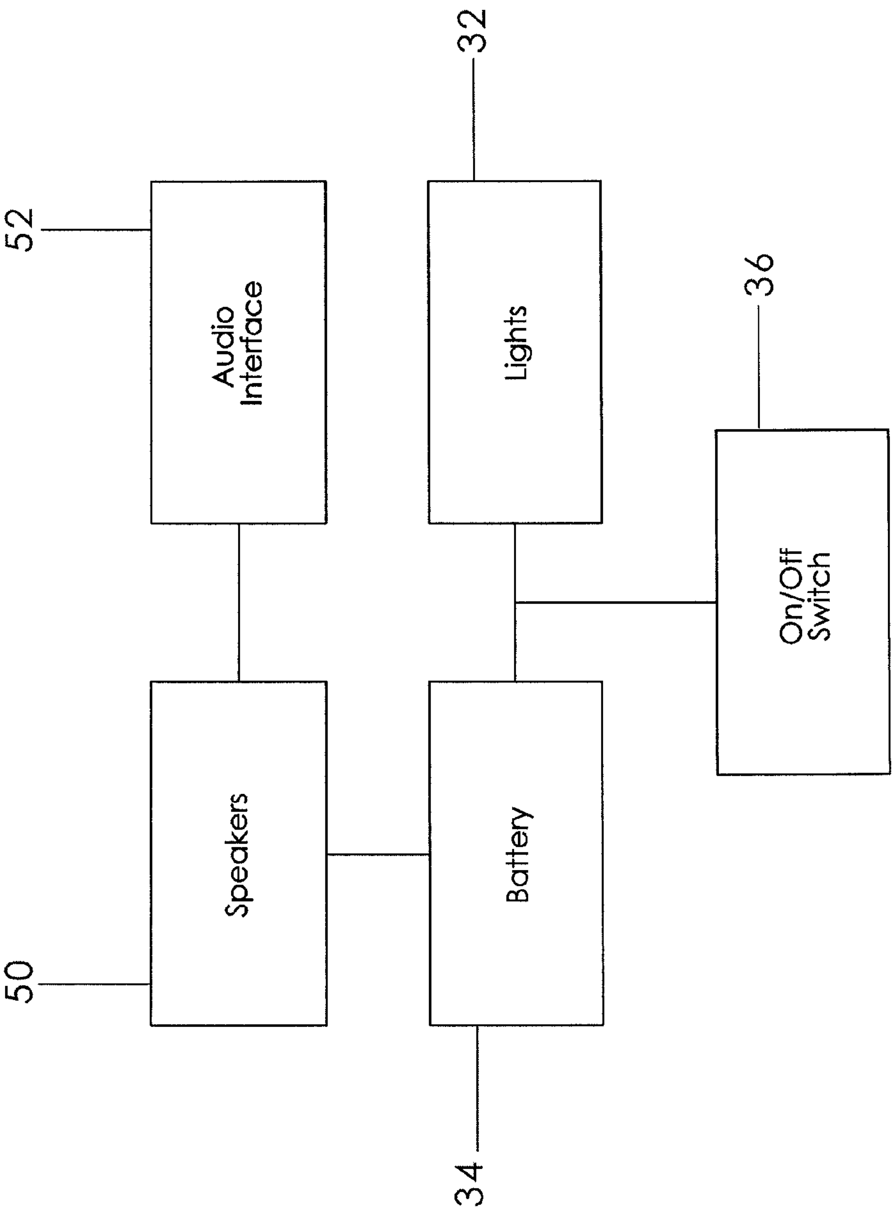
FIG. 7 is a block diagram of the electronic components of the lighting device according to the present invention.

In some embodiments, the lighting apparatus 20 may include at least one speaker 50 mounted to the bottom wall 26 of the light housing 22 (FIG. 6). If more than one speaker 50 is included, they may be spaced apart and may include different sizes and types of speakers so as to provide a rich and balanced sound quality. In addition, the light housing 22 may include an audio player interface 52 (FIG. 7) so that an audio player such as an mp3 player may be plugged in and played through the speakers 50.

In use, the light housing 22 may be coupled to the bottom of a skateboard 10 as described above. In embodiments having extension members, one or more entertainment devices 48 may be extended beyond either the front 14 or rear 16 end of the skateboard 10 depending on the orientation of the light housing 22. When the plurality of lights 32 are switched on, the light illuminates or glows from under the skateboard 10 during its use. Sound may also be emitted through speakers 50 mounted in the light housing 22 for additional entertainment.

It is understood that while certain forms of this invention have been illustrated and described, it is not limited thereto except insofar as such limitations are included in the following claims and allowable functional equivalents thereof.

The invention claimed is:

1. A lighting apparatus for use with a skateboard having front and rear ends with upper and lower surfaces extending between the front and rear ends, said lighting apparatus comprising:

a light housing having an opposed top and bottom walls with at least one side wall extending between peripheral edges of said top and bottom walls, said top, bottom, and side walls defining an interior space;

means for fastening an upper surface of said light housing top wall to a lower surface of the skateboard;

a plurality of lights positioned in said light housing and visible through said at least one side wall when energized;

a battery positioned in said interior space of said light housing and electrically connected to said plurality of lights;

an extension member having a proximal end attached to said light housing and a distal end extending away from said light housing, said extension member being generally parallel to an imaginary longitudinal axis of the skateboard; and an entertainment member connected to said distal end of said extension member.

2. The lighting apparatus of claim 1, wherein said fastening means is one of adhesive, complementary hook and loop fasteners, screws, and complementary bolt and nut fasteners.

3. The lighting apparatus of claim 2, wherein said light housing is selectively and removably coupled to the lower surface of the skateboard.

4. The lighting apparatus of claim 3 wherein said at least one side wall is transparent so that light from said plurality of lights passes therethrough when energized.

5. The lighting apparatus of claim 3, wherein said at least one side wall defines a plurality of spaced apart apertures configured to receive respective light emitting portions of said plurality of lights.

6. The lighting apparatus of claim 1 wherein said at least one side wall is transparent so that light from said plurality of lights passes therethrough when energized.

7. The lighting apparatus of claim 1, wherein said at least one side wall defines a plurality of spaced apart apertures configured to receive respective light emitting portions of said plurality of lights.

8. The lighting apparatus of claim 1, wherein each of said plurality of lights are light emitting diodes.

9. The lighting apparatus of claim 1, further comprising:

an auxiliary extension member attached to said distal end of said extension member and extending upwardly therefrom;

wherein said entertainment member is coupled to a free end of said auxiliary extension member.

10. The lighting apparatus of claim 9, wherein said entertainment device is a pinwheel rotatably coupled to said auxiliary extension member.

11. The lighting apparatus of claim 1, wherein said light housing includes a battery access door removably coupled to said light housing bottom wall.

12. The lighting apparatus of claim 1, further comprising:

at least one speaker mounted to a bottom wall of said light housing and electrically connected to said battery;

an audio player interface in data communication with said at least one speaker configured to be selectively connected to a audio player.

13. A lighting apparatus for use with a skateboard having front and rear ends with upper and lower surfaces extending between the front and rear ends, said lighting apparatus comprising:

a light housing having an opposed top and bottom walls with a plurality of side walls extending between peripheral edges of said top and bottom walls, said top, bottom, and side walls defining an interior space;

a fastener on an upper surface of said light housing top wall configured to selectively couple said light housing to a lower surface of the skateboard;

a plurality of lights positioned in said light housing;

wherein said light housing side walls are configured so that light from said plurality of lights is visible outside said light housing when said plurality of lights is energized;

a battery positioned in said interior space of said light housing and electrically connected to said plurality of lights for selectively energizing said plurality of lights;

a first extension member having a proximal end attached to said light housing and a distal end extending away from said light housing, said extension member being generally parallel to an imaginary longitudinal axis of the skateboard;

a second extension member attached to said distal end of said first extension member and extending upwardly therefrom;

an entertainment member connected to a free end of said second extension member.

14. The lighting apparatus of claim 13, wherein said fastener is one of adhesive, complementary hook and loop fasteners, screws, and complementary bolt and nut fasteners.

15. The lighting apparatus of claim 13 wherein said at least one side wall is transparent so that light from said plurality of lights passes therethrough when energized.

16. The lighting apparatus of claim 13, wherein said at least one side wall defines a plurality of spaced apart apertures configured to receive respective light emitting portions of said plurality of lights.

17. The lighting apparatus of claim 13, further comprising:

at least one speaker mounted to a bottom wall of said light housing and electrically connected to said battery;

an audio player interface in data communication with said at least one speaker configured to be selectively connected to a audio player.

* * * * *